United States Patent
Oka et al.

(10) Patent No.: US 6,837,513 B2
(45) Date of Patent: Jan. 4, 2005

(54) FIXING METHOD AND STRUCTURE OF INFLATOR, AND AIRBAG APPARATUS

(75) Inventors: Hidetomo Oka, Shiga (JP); Kazuhiko Joujima, Hikone (JP)

(73) Assignee: Takata Corporation, Tokyo (JP)

( * ) Notice: Subject to any disclaimer, the term of this patent is extended or adjusted under 35 U.S.C. 154(b) by 89 days.

(21) Appl. No.: 10/340,679

(22) Filed: Jan. 13, 2003

(65) Prior Publication Data

US 2003/0141705 A1 Jul. 31, 2003

(30) Foreign Application Priority Data

Jan. 28, 2002 (JP) ........................................ 2002-018687

(51) Int. Cl.[7] .............................................. B60R 21/20
(52) U.S. Cl. .................................. 280/728.2; 280/741
(58) Field of Search ............................. 280/728.2, 741, 280/732, 730.2

(56) References Cited

U.S. PATENT DOCUMENTS

| | | | | |
|---|---|---|---|---|
| 5,308,108 A | * | 5/1994 | Rion ........................ | 280/728.2 |
| 5,498,029 A | * | 3/1996 | Mossi et al. ................ | 280/741 |
| 5,533,745 A | * | 7/1996 | Jenkins et al. ............ | 280/728.2 |
| 5,611,563 A | * | 3/1997 | Olson et al. ............. | 280/728.2 |
| 5,676,390 A | * | 10/1997 | Olson ...................... | 280/728.2 |
| 5,934,700 A | | 8/1999 | Disam et al. | |
| 6,299,200 B1 | | 10/2001 | Bowers et al. | |
| 6,485,048 B2 | * | 11/2002 | Tajima et al. ............ | 280/728.2 |

FOREIGN PATENT DOCUMENTS

JP    2001-213262    8/2001

* cited by examiner

Primary Examiner—David R. Dunn
(74) Attorney, Agent, or Firm—Manabu Kanesaka

(57) ABSTRACT

For accommodating and fixing a substantially cylindrical inflator to an inflator holder, a method for fixing an inflator includes the steps of providing the first, second, and third press parts on an internal surface of the inflator holder at different locations in the peripheral direction of the inflator inserting the inflator into the inflator holder from one end of the inflator holder; and pressing the inflator at the first, second, and third press parts from an external periphery to fix the inflator. It is arranged that any of included angles between lines from a center of the inflator to the respective press parts is less than 180°.

10 Claims, 5 Drawing Sheets

US 6,837,513 B2

FIXING METHOD AND STRUCTURE OF INFLATOR, AND AIRBAG APPARATUS

BACKGROUND OF THE INVENTION AND RELATED ART STATEMENT

The present invention relates to a fixing method and a fixing structure of an inflator for inflating an airbag, and an airbag apparatus having the inflator fixed with the fixing structure.

An airbag apparatus provided in a high-speed vehicle such as an automobile comprises a folded airbag, an inflator for inflating the airbag, and a casing for accommodating the airbag and the inflator therein. In order to fix the inflator to the casing, the inflator may be accommodated into and fixed to an inflator holder, which is in turn fixed to the casing with bolts.

A conventional fixing method of an inflator will be described with reference to FIG. 5. An inflator 10 has a substantially cylindrical shape and a bolt 12 protruded from one end face thereof. The end face is also provided with a flange 14. Also, gas ejection openings (not shown) are provided on an external periphery of the inflator 10.

An inflator holder 20 comprises a substantially halved cylindrical body 22, an end plate 24 erected from one end of the cylindrical body 22, a bolt through-hole 26 formed on the end plate 24, a ring 28 erected from the other end of the cylindrical body 22, and stud bolts 30 projecting from a bottom of the cylindrical body 22.

The inflator 10 is inserted into the inflator holder 20 passing through the ring 28 so that the bolt 12 is inserted into the bolt through-hole 26 and the flange 14 abuts against the end plate 24. By fastening the bolt 12 with a nut 32, the inflator 10 is fixed to the inflator holder 20.

Although not shown, the inflator holder 20 is arranged within a casing of the airbag apparatus, and is fixed to the casing with the stud bolts 30, which are inserted into bolt through-holes of the casing and fastened with nuts.

In the conventional fixing method and the fixing structure of the inflator shown in FIG. 5, in order to fix the inflator to the inflator holder, it is required to fasten the bolt 12 with a nut 32.

It is an object of the present invention to provide a fixing method and a fixing structure of an inflator, in which the working efficiency in fixing the inflator is excellent without fastening nuts, and the number of parts is also reduced.

It is another object of the present invention to provide an airbag apparatus having the structure adopted thereto.

Further objects and advantages of the invention will be apparent from the following description of the invention.

SUMMARY OF THE INVENTION

According to the present invention, in accommodating and fixing a substantially cylindrical inflator to an inflator holder, a method for fixing an inflator comprises the steps of providing the first, second, and third press parts on an internal surface of the inflator holder at different locations in the peripheral direction of the inflator; inserting the inflator into the inflator holder from one end of the inflator holder; and pressing the inflator at the first, second, and third press parts from an external periphery to fix the inflator. It is arranged that any of included angles between lines from a center of the inflator to the respective press parts is less than 180°.

In such a method for fixing the inflator according to the present invention, the three press parts arranged on the inflator holder press the inflator, thereby eliminating a nut and nut fastening operation. The inflator fixed to the inflator holder abuts against the inflator holder at the three parts in the peripheral direction of the inflator holder. Further, any of the included angles between lines from the inflator center to the respective press parts is less than 180°, thereby eliminating wobble of the inflator.

According to the present invention, the first, second, and third press parts may be protruded from the internal surface of the inflator holder. The press parts protruded from the internal surface of the inflator holder formed in such a manner abut against the inflator, thus only three points in the peripheral direction contact an external peripheral surface of the inflator, thereby securely prevent the inflator from wobbling.

In the fixing method of the inflator according to the present invention, the inflator holder may comprise an extended piece projected at the one end thereof. After the inflator is inserted into the inflator holder, the extended piece is bent to face one end of the inflator. By bending the extended piece in such a manner, it is possible to prevent the inflator from displacing in the longitudinal direction.

A fixing structure of the inflator according to the present invention comprises an assembly in which the inflator is accommodated and fixed to the inflator holder by the method according to the present invention described above.

An airbag apparatus according to the present invention comprises a folded airbag; an inflator for inflating the airbag; and a casing accommodating the airbag and the inflator therein. The inflator is fixed to an inflator holder by the structure according to the present invention described above. Then, the inflator holder is fixed to the casing of the airbag apparatus.

DETAILED DESCRIPTION OF PREFERRED EMBODIMENTS

Figure 1:
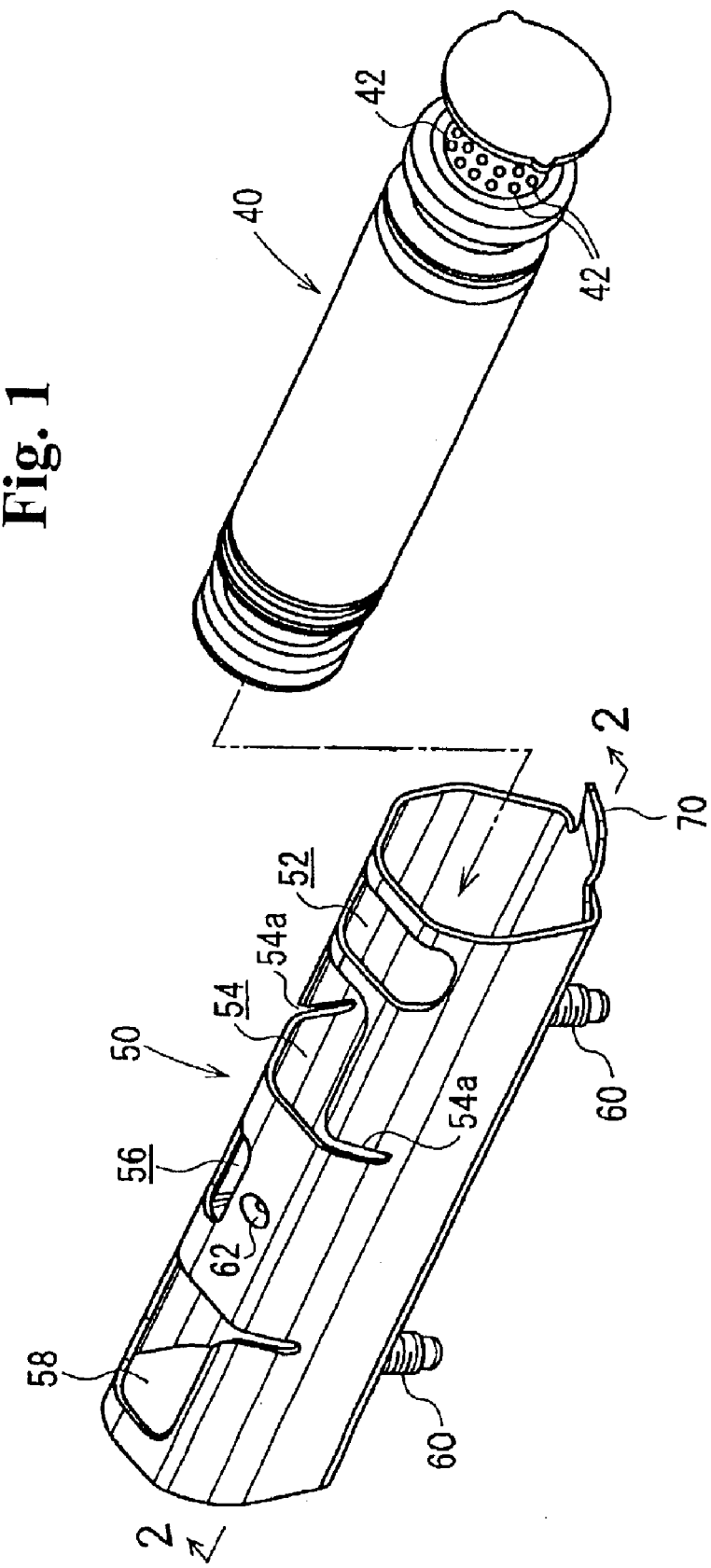
FIG. 1 is an exploded perspective view of an embodiment of the invention.
Figure 2:
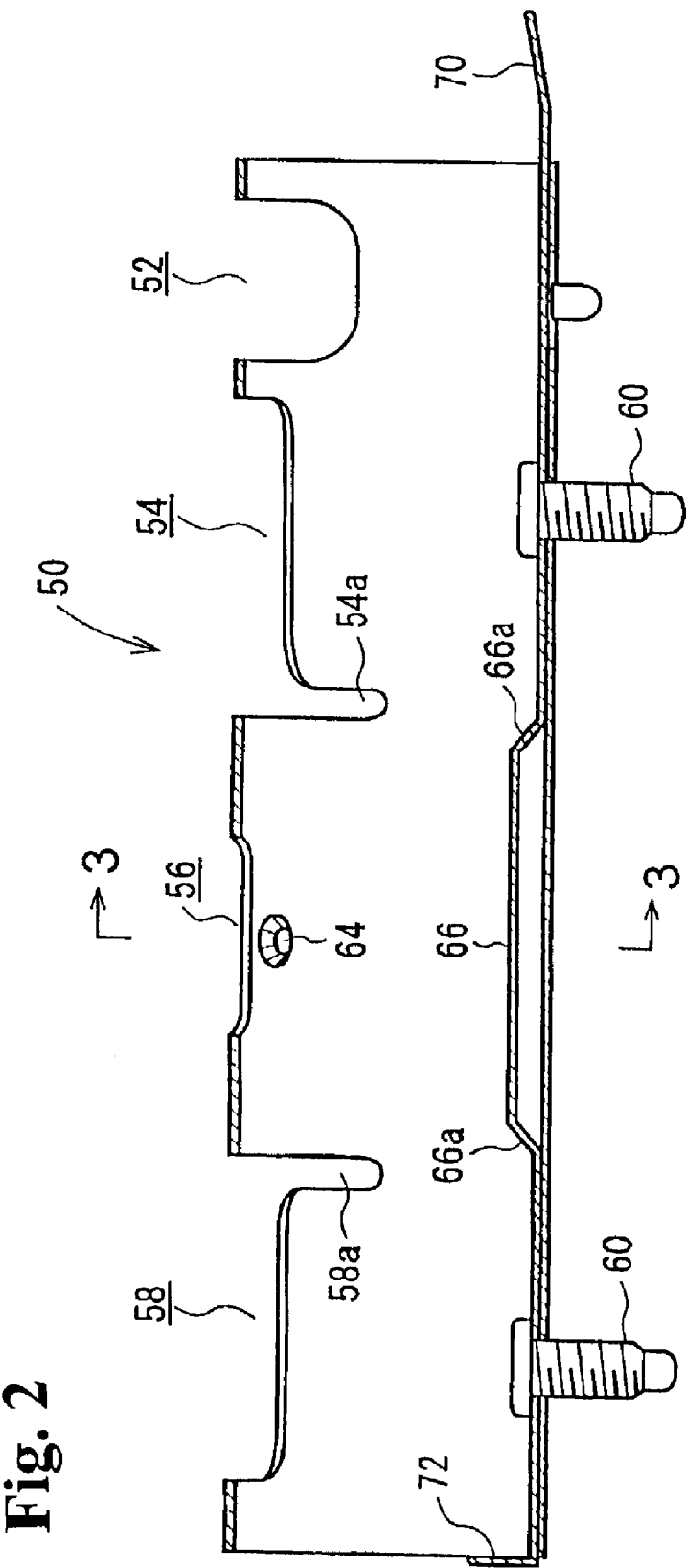
FIG. 2 is a sectional view showing an inflator holder taken along line 2—2 in FIG. 1.
Figure 3:
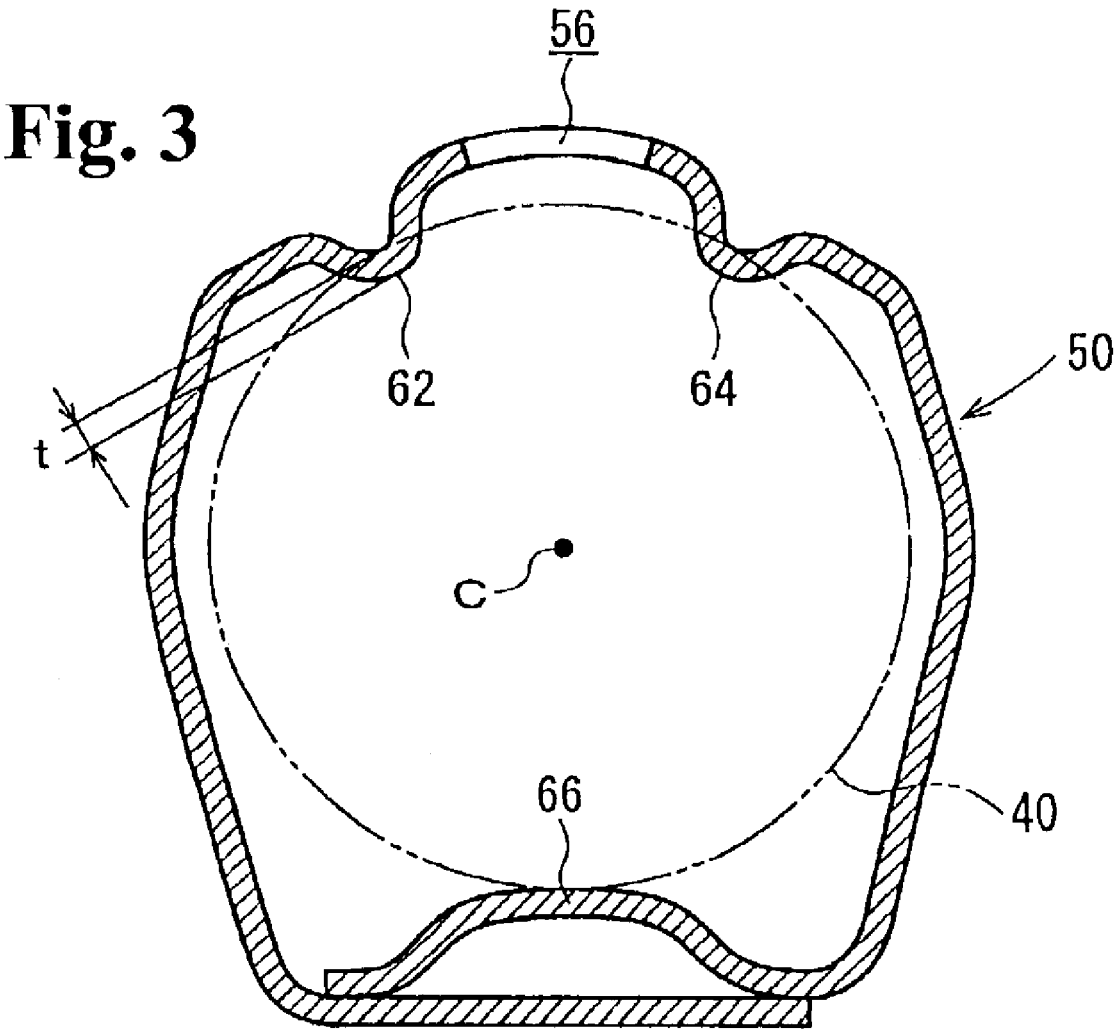
FIG. 3 is a sectional view showing the inflator holder taken along line 3—3 in FIG. 2.
Figure 4:
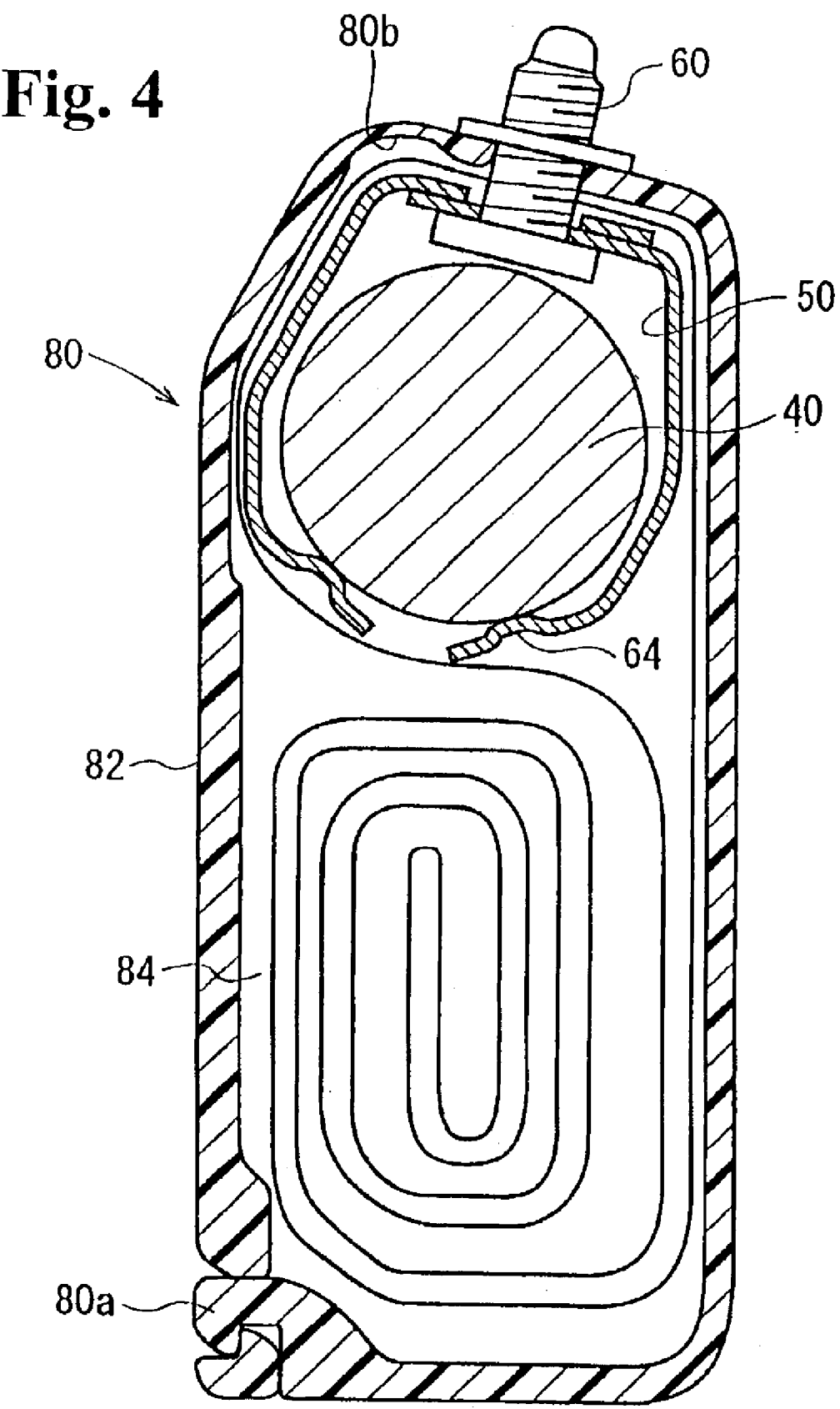
FIG. 4 is a sectional view showing an airbag apparatus.
Figure 5:
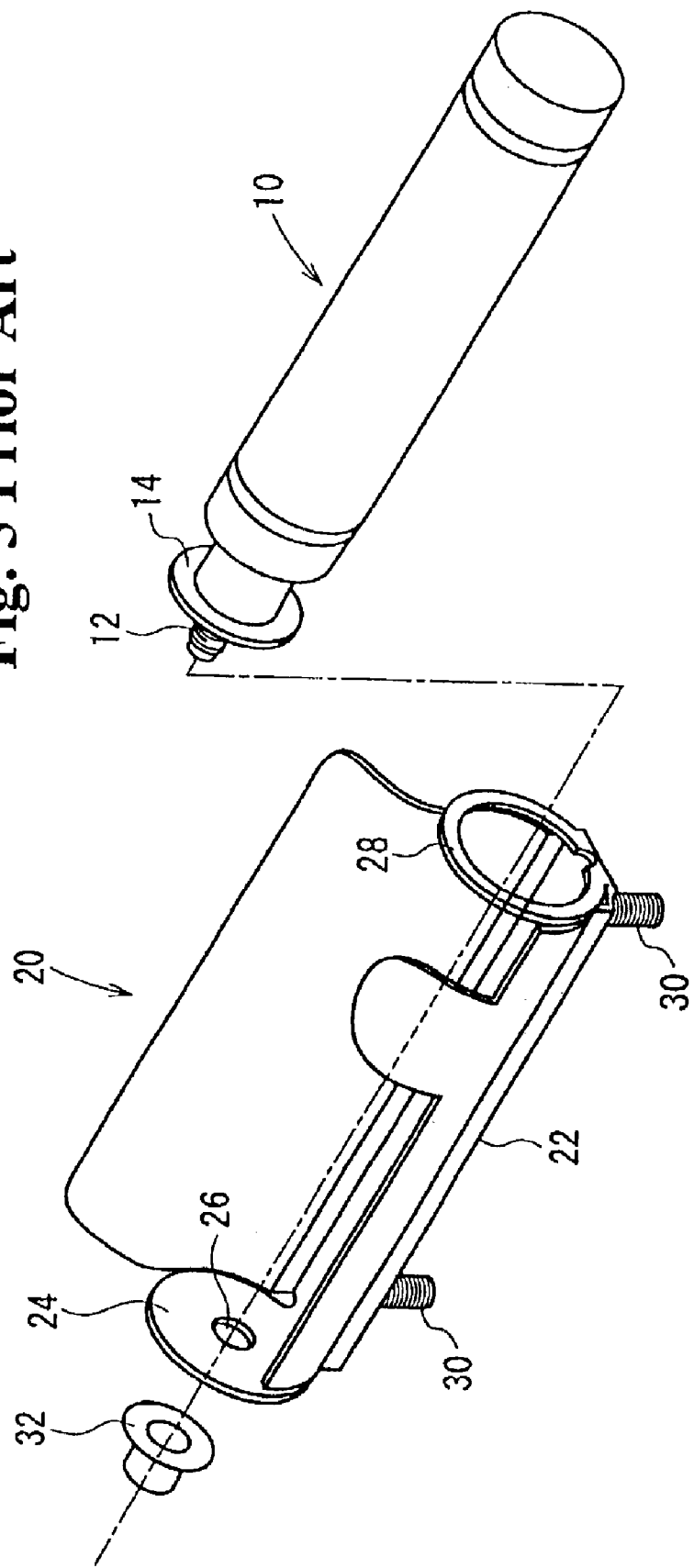
FIG. 5 is an exploded perspective view showing a conventional example.

Hereunder, embodiments of the present invention will be described with reference to the accompanying drawings. FIG. 1 is an exploded perspective view showing an embodiment; FIG. 2 is a cross-sectional view showing an inflator holder taken along line 2—2 in FIG. 1; FIG. 3 is a cross-sectional view showing the inflator holder taken along line 3—3 in FIG. 2; and FIG. 4 is a cross-sectional view showing an airbag apparatus.

An inflator 40 is formed in substantially a cylindrical shape and has gas ejection openings 42 provided at one end thereof (the right side in FIG. 1). An inflator holder 50 has a cylindrical shape surrounding an external periphery of the inflator 40. According to the embodiment, the inflator holder has polygonal sections in the longitudinal and vertical directions.

A metallic plate is punched and pressed to form the inflator holder 50 in a predetermined shape, which is then formed in a prism-shape. Then, edges of the metallic plate, shown on the bottom side of FIGS. 1 to 3, are spot-welded together.

The inflator holder 50 is provided with clearance holes 52, 54, 56, and 58 formed on an upper side surface thereof in FIGS. 1 to 3 with intervals in the longitudinal direction. On a bottom surface of the inflator holder 50, shown in FIGS. 1 to 3, two bolts 60 are fixed so as to project outwardly.

At a substantially middle of the inflator holder 50 in the longitudinal direction, the first and second press parts 62 and 64 are formed on the top surface of the inflator holder 50. The third press part 66 is formed on the bottom surface. The press parts 62, 64, and 66 are protruded toward inside the inflator holder 50.

The first and second press parts 62 and 64 are substantially truncated-conical projections and arranged near an end of the clearance hole 56. The first and second press parts 62 and 64 oppose each other with the clearance hole 56 therebetween. Incidentally, both or either of the first and second press parts 62 and 64 may have a convex shape similar to the third press part 66 as described below.

The third press part 66 is formed in a convex shape extending for a predetermined length in the longitudinal direction of the inflator holder 50. A length of the third press part 66 is substantially the same as a length between the clearance hole 54 and the clearance hole 58. Each end of the third press part 66 in the longitudinal direction has an inclined surface 66a with a height gradually decreasing toward the internal bottom surface of the inflator holder 50. Incidentally, as the third press part, a plurality of projections may be provided with an interval in the longitudinal direction of the inflator holder 50.

The clearance holes 54 and 58 has cut-in slits 54a and 58a extending in the peripheral direction of the inflator holder 50 at sides closer to the clearance hole 56, respectively. In this structure, areas near the first and second press parts 62 and 64 can easily move outwardly when the inflator 40 presses the press parts 62 and 64, as described later.

Extended pieces 70 and 72 are formed at the respective ends of the inflator holder 50. One extended piece 70 extends in the longitudinal direction of the inflator holder 50 and the other extended piece 72 is folded substantially upright toward the center of the end face of the inflator holder 50 before the inflator 40 is inserted.

The inflator 40 is inserted into the inflator holder 50 from the end having the extended piece 70. A leading edge of the inflator 40 reaches the end (the right edge in FIG. 2) of the third press part 66, and then reaches the first and second press parts 62 and 64.

An inner circle touching the first, second, and third press parts 62, 64, and 66 is smaller than the external periphery of the inflator 40, as shown in FIG. 3. Therefore, after the leading edge of the inflator 40 reaches the first and second press parts 62 and 64, the inflator 40 is pushed into the inflator holder 50 pressing the press parts 62, 64, and 66 so as to move away from each other. The first and second press parts 62 and 64 are located near the edges of the clearance hole 56. The inflator holder 50 has lower rigidity near the edges of the clearance hole than near the third press part 66. Therefore, when the inflator 40 is pushed into the holder, mainly the areas near the first and second press parts 62 and 64 are retracted or expanded by a dimension t shown in FIG. 3 so that the inflator holder 50 is deformed to increase the diameter.

Then, the inflator 40 is pushed into the holder with strong friction with the press parts 62, 64, and 66. Finally, the entire inflator 40 is accommodated into the inflator holder 50 when the leading edge of the inflator 40 abuts against the extended piece 72 formed at the end of the inflator holder 50. The insertion operation of the inflator 40 is completed by folding the extended piece 70 upright toward the center of the end face of the inflator holder 50.

As shown in FIG. 3, the inflator 40 is fixed inside the inflator holder 50 by pressing only the first, second, and third press parts 62, 64, and 66 against the external periphery of the inflator 40. The inflator 40 touches the inflator holder 50 only at three points of the press parts 62, 64, and 66, which are located at different positions in the periphery thereof, so that the inflator 40 does not wobble. As shown in FIG. 3, the press parts 62, 64, and 66 are arranged so that any of the included angles on a plane perpendicular to the longitudinal direction between lines (not shown) from the center C of the inflator 40 to the respective press parts 62, 64, and 66 is less than 180°.

According to the fixing method of the inflator, a nut and nut fastening operation are not required, so that the number of the parts is small, and the inflator fixing operation is easy. Also, the fixing of the inflator 40 after being inserted into the inflator holder 50 is sufficiently firm.

FIG. 4 is a sectional view showing an airbag apparatus having an assembly in which the inflator 40 is held in the inflator holder 50 in this manner.

An airbag apparatus 80 comprises a casing 82 mainly made of a synthetic resin and an airbag 84 folded and accommodated within the casing 82. The casing 82 having the inflator 40 and the inflator holder 50 described above comprises a hook 80a for engaging a front lid portion and a flexible thin-wall portion (hinge portion) 80b. The inflator 40 and the inflator holder 50 are arranged within the airbag 84, and the bolts 60 penetrating the airbag 84 and the casing 82 are protruded outside the casing 82. The inflator 40, the inflator holder 50, and the airbag 84 are fixed to the casing 82 by fastening the bolts 60 with nuts.

When the inflator 40 is actuated, gas from the gas ejection openings 42 flows into the airbag 84 mainly passing through the clearance hole 52 so as to inflate the airbag 84. The hook 80a of the casing 82 is pushed to disengage by the gas pressure in the airbag 84, so that the front surface of the casing 82 is bent and opened along the thin-walled portion 80b. Therefore, the airbag 84 is expanded outside the casing 82 for protecting an occupant.

The airbag apparatus 80 shown in FIG. 4 is suitable for a side-airbag apparatus laterally extending along an automobile seat, for example. The inflator and the inflator holder assembly having the fixing structure according to the present invention may be applied to various airbag apparatuses such as those for a passenger seat, rear seat, protecting legs, and protecting a head.

The present invention is not limited to the structures shown in the drawings. Various modifications may be adopted. For example, the inflator 40 according to the embodiment has the gas ejecting openings 42 provided on one end. Alternatively, gas ejecting openings may be arranged on both ends or may be arranged along the overall length. Also, the shape of the inflator holder may obviously be other than that shown in the drawings.

As described above, according to the present invention, the inflator can be easily and securely fixed to the inflator holder.

While the invention has been explained with reference to the specific embodiments of the invention, the explanation is illustrative and the invention is limited only by the appended claims.

What is claimed is:

1. A method for accommodating and fixing an inflator having an elongated shape to an inflator holder, comprising the steps of:

providing at least three press parts on an internal peripheral surface of the inflator holder at different positions so that an included angle between two adjacent lines extending radially outwardly from a center of the inflator holder to centers of the respective press parts becomes less than 180°, at least one of the press parts being formed of a projection having a round bottom and a top with a reduced size and at least one of the press parts having an elongated convex shape extending for a predetermined length along a longitudinal direction of the inflator holder, inserting the inflator into the inflator holder from an opening of the inflator holder, and pressing the inflator against, the inflator holder at the press parts to fix the inflator thereto.

2. A method according to claim 1, wherein said press parts are formed to protrude from the internal surface of the inflator holder toward the center thereof.

3. A method according to claim 2, wherein said press parts are formed such that a radius of a circle passing through inner ends of the press parts is less than a radius of the inflator and can expand radially outwardly.

4. A method according to claim 3, wherein said projection has a substantially truncated-conical shape.

5. A method according to claim 1, further comprising a step of providing an extended piece projecting outwardly from an opening of the inflator holder, said extended piece being bent to face one end of the inflator after the inflator is inserted into the inflator holder.

6. A fixing structure of the inflator, wherein the inflator is accommodated and fixed to the inflator holder using the method according to claim 1.

7. An airbag apparatus comprising a folded airbag, the inflator for inflating the airbag and the inflator holder for holding the inflator, which have the structure according to claim 6, and a casing for accommodating the airbag and the inflator holder.

8. A fixing structure comprising:

an inflator having a cylindrical shape, and an inflator holder for accommodating and fixing the inflator therein, said inflator holder having at least three press parts on an internal peripheral surface thereof at different positions so that an included angle between two adjacent lines extending radially outwardly from a center of the inflator holder to centers of the respective press parts becomes less than 180°, and a radius of a circle passing through inner ends of the press parts which is less than a radius of the inflator to allow the inflator holder to expand radially outwardly to receive the inflator therein, at least one of the press parts being formed of a projection having a round bottom and a top with a reduced size and at least one of the press parts having an elongated convex shape extending for a redetermined length along a longitudinal direction of the inflator holder.

9. A fixing structure according to claim 8, wherein said inflator holder further includes a hole between two of the three press parts.

10. A fixing structure according to claim 9, wherein said projection has a substantially truncated-conical shape.

* * * * *